(12) United States Patent
Bender et al.

(10) Patent No.: US 7,517,928 B2
(45) Date of Patent: Apr. 14, 2009

(54) SILOXANE-ACRYLATE INTERPENETRATING NETWORKS AND METHODS FOR PRODUCING THE SAME

(75) Inventors: Timothy P Bender, Toronto (CA); Barkev Keoshkerian, Thornhill (CA); John F Graham, Oakville (CA); Yvan Gagnon, Mississauga (CA); Cheng-Kuo Hsiao, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 529 days.

(21) Appl. No.: 11/267,336

(22) Filed: Nov. 7, 2005

(65) Prior Publication Data

US 2007/0106023 A1    May 10, 2007

(51) Int. Cl.
  *C08L 83/07* (2006.01)
  *G03G 15/04* (2006.01)
  *C08K 5/18* (2006.01)

(52) U.S. Cl. .................. 524/258; 524/257; 524/188; 525/100; 525/903; 430/66

(58) Field of Classification Search .............. 430/66; 525/100, 903; 524/188, 257, 258
  See application file for complete search history.

(56) References Cited

U.S. PATENT DOCUMENTS

| | | | |
|---|---|---|---|
| 4,265,990 A | 5/1981 | Stolka et al. | |
| 5,322,912 A | 6/1994 | Georges et al. | |
| 5,424,375 A * | 6/1995 | He et al. | 525/479 |
| 6,277,304 B1 * | 8/2001 | Wei et al. | 252/500 |
| 6,313,219 B1 * | 11/2001 | Taylor-Smith | 524/853 |
| 6,433,100 B1 * | 8/2002 | Kramer et al. | 525/327.6 |
| 6,730,448 B2 | 5/2004 | Yoshino et al. | |
| 7,074,856 B2 * | 7/2006 | Ho et al. | 525/100 |
| 7,223,817 B2 * | 5/2007 | Nakagawa et al. | 525/105 |
| 7,238,456 B2 | 7/2007 | Bender et al. | 430/56 |
| 2004/0086794 A1 | 5/2004 | Yamada et al. | |

FOREIGN PATENT DOCUMENTS

| | | |
|---|---|---|
| JP | A-57-128344 | 8/1982 |
| JP | B2-60-022347 | 6/1985 |
| JP | A-63-065449 | 3/1988 |
| JP | A-04-015659 | 1/1992 |
| JP | B2-05-047104 | 7/1993 |

OTHER PUBLICATIONS

G. Moad et al., *Tetrahedron Letters*, 22, 1165 (1981).

* cited by examiner

*Primary Examiner*—Margaret G Moore
(74) *Attorney, Agent, or Firm*—Oliff & Berridge, PLC

(57) ABSTRACT

Siloxane-containing materials that have been prepared by a sol-gel method and polymeric binder materials from interpenetrating networks. Silicon-containing layers including such interpenetrating networks are provided. Methods for preparing interpenetrating networks and silicon-containing layers including interpenetrating networks are also provided. In addition, photoreceptors and image-forming apparatus including such silicon-containing layers are provided.

11 Claims, 6 Drawing Sheets

FIG. 4

| No. | Ar¹ | Ar² | Ar³ & Ar⁴ | Ar⁵ | k | –S |
|---|---|---|---|---|---|---|
| V-1 | biphenyl | phenyl | — | phenyl | 0 | $-(CH_2)_2-COO-(CH_2)_3-Si(O^iPr)_3$ |
| V-2 | biphenyl | phenyl | — | phenyl | 0 | $-(CH_2)_2-COO-(CH_2)_3-SiMe(O^iPr)_2$ |
| V-3 | biphenyl | phenyl | — | phenyl | 0 | $-(CH_2)_2-COO-(CH_2)_3-SiMe_2(O^iPr)$ |
| V-4 | methylphenyl | biphenyl | — | biphenyl | 0 | $-(CH_2)_2-COO-(CH_2)_3-Si(O^iPr)_3$ |
| V-5 | methylphenyl | biphenyl | — | biphenyl | 0 | $-(CH_2)_2-COO-(CH_2)_3-SiMe(O^iPr)_2$ |
| V-6 | methylphenyl | biphenyl | — | biphenyl | 0 | $-(CH_2)_2-COO-(CH_2)_3-SiMe_2(O^iPr)$ |
| V-7 | phenyl | phenyl | — | phenyl | 0 | $-(CH_2)_2-COO-(CH_2)_3-Si(O^iPr)_3$ |
| V-8 | phenyl | phenyl | — | phenyl | 0 | $-(CH_2)_2-COO-(CH_2)_3-SiMe(O^iPr)_2$ |
| V-9 | phenyl | phenyl | — | phenyl | 0 | $-(CH_2)_2-COO-(CH_2)_3-SiMe_2(O^iPr)$ |
| V-10 | biphenyl | biphenyl | — | biphenyl | 0 | $-(CH_2)_2-COO-(CH_2)_3-Si(O^iPr)_3$ |
| V-11 | biphenyl | biphenyl | — | biphenyl | 0 | $-(CH_2)_2-COO-(CH_2)_3-SiMe(O^iPr)_2$ |
| V-12 | biphenyl | biphenyl | — | biphenyl | 0 | $-(CH_2)_2-COO-(CH_2)_3-SiMe_2(O^iPr)$ |

SILOXANE-ACRYLATE INTERPENETRATING NETWORKS AND METHODS FOR PRODUCING THE SAME

BACKGROUND

This disclosure relates generally to processes for the formation of siloxane-acrylate interpenetrating networks, and to the use of such siloxane-acrylate interpenetrating networks in producing overcoating layers for electrophotographic imaging members.

In electrophotography, an electrophotographic substrate containing a photoconductive insulating layer on a conductive layer is imaged by first uniformly electrostatically charging a surface of the substrate. The substrate is then exposed to a pattern of activating electromagnetic radiation, such as, for example, light. The light or other electromagnetic radiation selectively dissipates the charge in illuminated areas of the photoconductive insulating layer while leaving behind an electrostatic latent image in non-illuminated areas of the photoconductive insulating layer. This electrostatic latent image is then developed to form a visible image by depositing finely divided electroscopic marking particles on the surface of the photoconductive insulating layer. The resulting visible image is then transferred from the electrophotographic substrate to a necessary member, such as, for example, an intermediate-transfer member or a print substrate, such as paper. This image-developing process can be repeated as many times as necessary with reusable photoconductive insulating layers.

Image-forming apparatus such as copiers, printers and facsimiles, including electrophotographic systems for charging, exposure, development, transfer, etc., using electrophotographic photoreceptors have been widely employed. In such image-forming apparatus, there are ever-increasing demands for improving the speed of the image-forming processes, improving image quality, miniaturizing and prolonging the life of the apparatus, reducing production and running costs, etc. Further, with recent advances in computers and communication technology, digital systems and color-image output systems have been applied also to image-forming apparatus.

Electrophotographic imaging members (i.e. photoreceptors) are well known. Photoreceptors having either flexible-belt or rigid-drum configurations are commonly used in electrophotographic processes. Photoreceptors may comprise a photoconductive layer including a single layer or composite layers. These photoreceptors take many different forms. For example, layered photoresponsive imaging members are known in the art. U.S. Pat. No. 4,265,990, the entire disclosure of which is totally incorporated herein by reference, describes a layered photoreceptor having separate photogenerating and charge-transport layers. The photogenerating layer disclosed in the 990 patent is capable of photogenerating holes and injecting the photogenerated holes into the charge-transport layer. Thus, in the photoreceptors of the 990 patent, the photogenerating material generates electrons and holes when subjected to light.

More advanced photoconductive photoreceptors containing highly specialized component layers are also known. For example, multi-layered photoreceptors may include one or more of a substrate, an undercoat layer, an intermediate layer, an optional hole- or charge-blocking layer, a charge-generating layer (including a photogenerating material in a binder) over an undercoating layer and/or a blocking layer, and a charge-transport layer (including a charge-transport material in a binder). Additional layers, such as one or more overcoat layers, may be included as well.

In view of such a background, improvement in electrophotographic properties and durability, miniaturization, reduction in cost, etc., in photoreceptors have been studied, and photoreceptors using various materials have been proposed.

For example, JP-A-63-65449 (the term "JP-A" means an "unexamined published Japanese patent application"), the entire disclosure of which is totally incorporated herein by reference, discloses photoreceptors in which fine silicone particles are added to a photosensitive layer, and also discloses that such addition of the fine silicone particles imparts lubricity to a surface of the photoreceptor.

Further, in forming a photosensitive layer, a method has been proposed in which a charge-transfer substance is dispersed in a binder polymer or a polymer precursor thereof, and then the binder polymer or the polymer precursor thereof is cured. JP-B-5-47104 (the term "JP-B" means an "examined Japanese patent publication") and JP-B-60-22347, the entire disclosures of which are totally incorporated herein by reference, disclose photoreceptors using silicone materials as the binder polymers or the polymer precursors thereof.

Furthermore, in order to improve mechanical strength of the photoreceptor, a protective layer is formed on the surface of the photosensitive layer in some cases. Often, a cross-linkable resin is used as a material for the protective layer. However, protective layers formed by cross-linkable resin act as insulating layers, which impair the photoelectric characteristics of the photoreceptor. For this reason, a method of dispersing a fine conductive metal oxide powder, as disclosed in JP-A-57-128344, or a charge-transfer substance, as disclosed in JP-A-4-15659, in the protective layer and a method of reacting a charge-transfer substance having a reactive functional group with a thermoplastic resin to form the protective layer have been proposed. The entire disclosures of JP-A-57-128344 and JP-A-4-15659 are totally incorporated herein by reference.

However, even the above-mentioned conventional photoreceptors are not necessarily sufficient in electrophotographic characteristics and durability, particularly when used in combination with a charger of the contact-charging system (contact charger) or a cleaning apparatus, such as a cleaning blade.

Further, when the photoreceptor is used in combination with the contact charger and a toner obtained by chemical polymerization (polymerization toner), image quality may be deteriorated due to a surface of the photoreceptor being stained with a discharge product produced in contact charging or the polymerization toner remaining after a transfer step. Still further, the use of a cleaning blade to remove discharge product or remaining toner from the photoreceptor surface involves friction and abrasion between the photoreceptor surface and the cleaning blade, which tends to damage the photoreceptor surface, to break the cleaning blade or to turn up the cleaning blade.

The use of silicon-containing compounds in photoreceptor layers, including in photosensitive and protective layers, has been shown to increase the mechanical lifetime of photoreceptors, under charging conditions and scorotron-charging conditions. For example, U.S. Patent Application Publication No. 2004/0086794, the entire disclosure of which is totally incorporated herein by reference, discloses a photoreceptor having improved mechanical strength and stain resistance.

Photoreceptors having low wear rates, such as those described in U.S. Patent Application Publication No. 2004/0086794, also have low refresh rates. Low wear and refresh rates are a primary cause of image-deletion errors, particularly under conditions of high humidity and high temperature. U.S. Pat. No. 6,730,448, the entire disclosure of which is totally incorporated herein by reference, addresses this issue in its disclosure of photoreceptors having some improvement in image quality, fixing ability, even in an environment of high heat and humidity.

In photoreceptors, deletion of a developed image can be the result of degradation of the top-most surface of the photoreceptor. This deletion can occur when the photoreceptor is exposed to environmental contaminants, such as those typically found around the charging device of a xerographic engine. The image deletion can increase under conditions of high heat and/or high humidity.

In typical photoreceptors, where the outermost surface comprises a solid-state solution of a hole-transporting arylamine compound in a polymeric binder material, image deletion can occur when the environmental contaminants around the charging device react with hole-transporting arylamine compounds to form highly conductive species.

However, in photoreceptors in which the outermost layer is a siloxane-organic hybrid material containing a hole-transporting arylamine moiety, image deletion can occur when the environmental contaminants around the charging device in the xerographic engine interact with the siloxane component of the siloxane-organic hybrid material. A chemical reaction by which residual alkoxides of the siloxane components hydrolyze to form highly polar silanol moieties results from this interaction. These highly polar silanols, which reside on the outermost surface of the photoreceptor and both attract and retain environmental contaminants formed by the charging device, cause highly conductive zones to form on the surface of the photoreceptor. In the presence of high heat and/or high humidity, these highly conductive zones can manifest as a deletion of the developed image.

Thus, the above-mentioned conventional photoreceptors are not necessarily sufficient in electrophotographic characteristics and durability, particularly when used in high-heat and/or high-humidity environments.

Thus, there still remains a need for photoreceptors having high mechanical strength, improved electrophotographic characteristics and improved image-deletion characteristics, even under conditions of high temperature and high humidity.

SUMMARY

Silicon-containing layers for photoreceptors, in which the silicon-containing layers have high mechanical strength, improved electrophotographic characteristics and improved image-deletion characteristics even under conditions of high temperature and high humidity, are provided.

Separately provided are silicon-containing layers including interpenetrating networks of polymeric binder materials and silicon-containing materials.

Separately provided are silicon-containing layers in which interpenetrating networks of polymeric binder materials and silicon-containing materials are formed by sol-gel processes.

Separately provided are sol-gel processes for preparing interpenetrating networks of polymeric binder materials and silicon-containing materials.

Separately provided are photoreceptors including silicon-containing layers that include interpenetrating networks of polymeric binder materials and silicon-containing materials.

Separately provided are image-forming apparatuses that include photoreceptors including silicon-containing layers that include interpenetrating networks of polymeric binder materials and silicon-containing materials.

These and other features and advantages of various exemplary embodiments of materials, devices, systems and/or methods are described in, or are apparent from, the following detailed description of various exemplary embodiments of the methods and systems.

BRIEF DESCRIPTION OF THE DRAWINGS

FIG. 4 sets forth exemplary siloxane-containing arylamine compounds.

DETAILED DESCRIPTION OF EMBODIMENTS

Figure 1:
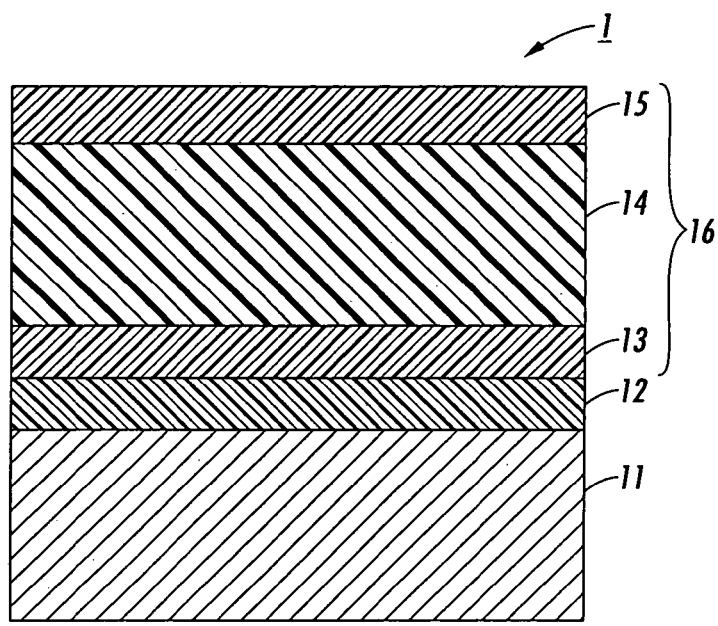
FIG. 1 is a schematic cross-sectional view showing an embodiment of a photoreceptor.

Exemplary embodiments will be described in detail below with reference to drawings in some cases. In the drawings, the same reference numerals and signs are used to designate the same or corresponding parts, and repeated descriptions are avoided.

Photoreceptor

In photoreceptors of embodiments, photosensitive layers may comprise one or more silicon-containing layers, and the silicon-containing layers may further contain resin.

In embodiments, the resin may be a resin soluble in a liquid component in a coating solution used for formation of this layer. Such a liquid-soluble resin may be selected based upon the liquid component employed. For example, if the coating solution contains an alcoholic solvent (such as methanol, ethanol or butanol), a polyvinyl acetal resin (such as a polyvinyl butyral resin), a polyvinyl formal resin or a partially acetalized polyvinyl acetal resin in which butyral is partially modified with formal or acetoacetal, a polyamide resin, a cellulose resin (such as ethyl cellulose) and a phenol resin may be suitably chosen as the alcohol-soluble resins. These resins may be used either alone or as a combination of two or more such resins. Of the above-mentioned resins, the polyvinyl acetal resin is used in some embodiments to obtain the benefits of its electric characteristics.

In embodiments, the weight-average molecular weight of the resin soluble in the liquid component may be in a range of from about 2,000 to about 1,000,000, such as from about 5,000 to about 50,000. When the weight-average molecular weight is less than about 2,000, the effect of enhancing discharge-gas resistance, mechanical strength, scratch resistance, particle dispersibility, etc., tends to become insufficient. However, when the weight-average molecular weight exceeds about 1,000,000, the resin solubility in the coating solution decreases, and the amount of resin added to the coating solution may be limited and poor film formation in the production of the photosensitive layer may result.

Further, the amount of resin soluble in the liquid component may be, in embodiments, in a range of from about 0.1 to about 15% by weight, such as from about 0.5 to about 10% by weight, based on the total amount of the coating solution. When the amount added is less than about 0.1% by weight, the effect of enhancing discharge-gas resistance, mechanical strength, scratch resistance, particle dispersibility, etc., may become insufficient. However, if the amount of the resin soluble in the liquid component exceeds about 15% by weight, there may be a tendency to form indistinct images when the photoreceptor is used at high temperature and high humidity.

As used herein, a "high-temperature environment" or "high-temperature conditions" refer to an atmosphere in which the temperature is at least about 28° C., such as about 28° C. to about 50° C. or to about 75° C. A "high-humidity environment" or "high-humidity conditions" refer to an atmosphere in which the relative humidity is at least about 75%, such as about 75% to about 90% or about 100%.

Silicon-containing compounds used in embodiments, contain at least one silicon atom, but are otherwise not particularly limited. However, a compound containing two or more silicon atoms may be used in embodiments. The use in embodiments of a compound containing two or more silicon atoms allows both the strength and image quality of the photoreceptor to be achieved at higher levels.

In embodiments, at least one member selected from silicon-containing compounds represented by formulas (2) to (4) and hydrolysates or hydrolytic condensates thereof may be used.

| | |
|---|---|
| $W^1(-SiR_{3-a}Q_a)_2$ | (2) |
| $W^2(-D-SiR_{3-a}Q_a)_b$ | (3) |
| $SiR_{4-c}Q_c$ | (4) |

In formulas (2) to (4), $W^1$ represents a divalent organic group, $W^2$ represents an organic group derived from a compound having hole-transport capability, R represents a member selected from the group consisting of a hydrogen atom, an alkyl group and a substituted or unsubstituted aryl group, Q represents a hydrolytic group, D represents a divalent group, a represents an integer of 1 to 3, represents an integer of 2 to 4, and c represents an integer of 1 to 4.

R in formulas (2) to (4) represents a hydrogen atom, an alkyl group, such as a $C_1$-$C_5$ alkyl group, or a substituted or unsubstituted aryl group, such as a substituted or unsubstituted $C_6$-$C_{15}$ aryl group, as described above.

Further, the hydrolytic group represented by Q in formulas (2) to (4) means a functional group that can form a siloxane bond (O—Si—O) by hydrolysis in the curing reaction of the compound represented by any one of formulas (2) to (4). Non-limiting examples of the hydrolytic groups that may be used in embodiments include a hydroxyl group, an alkoxyl group, a methyl ethyl ketoxime group, a diethylamino group, an acetoxy group, a propenoxy group and a chloro group. In particular embodiments, a group represented by —OR″, in which R″ represents a $C_1$-$C_{15}$ alkyl group or a trimethylsilyl group, may be used.

In formula (3), the divalent group represented by D may be, in embodiments, a divalent hydrocarbon group represented by —$C_nH_{2n}$—, —$C_nH_{2n-2}$—, —$C_nH_{2n-4}$—(n is an integer of 1 to about 15, such as from 2 to about 10, —$CH_2$—$C_6H_4$— or —$C_6H_4$—$C_6H_4$—, an oxycarbonyl group (—COO—), a thio group (—S—), an oxy group (—O—), an isocyano group (—N=CH—) or a divalent group in which two or more such divalent hydrocarbon groups are combined. The divalent group may have a substituent group such as an alkyl group, a phenyl group, an alkoxyl group or an amino group on its side chain. In embodiments in which D is one of the above-mentioned divalent groups, proper flexibility may be imparted to an organic silicate skeleton, thereby tending to improve the strength of the layer.

Non-limiting examples of compounds representable by formula (2) include disiloxane compounds, such as those shown in Table 1. As used herein, "Me" indicates a methyl (—$CH_3$) group; "OMe" indicates a methoxy (—$OCH_3$) group; "Et" indicates an ethyl (—$CH_2CH_3$) group; "OEt" indicates an ethoxy (—$OCH_2CH_3$) group; "i-Pr" indicates an isopropyl (—$CH(CH_3)_2$) group; "O-i-Pr" indicates an isopropoxy (—$OCH(CH_3)_2$) group.

TABLE 1

| No. | Structural Formula |
|---|---|
| III-1 | $(MeO)_3Si$—$(CH_2)_2$—$Si(OMe)_3$ |
| III-2 | $(MeO)_2Me$—$(CH_2)_2$—$SiMe(OMe)_2$ |
| III-3 | $(MeO)_2MeSi$—$(CH_2)_6$—$SiMe(OMe)_2$ |
| III-4 | $MeO)_3Si$—$(CH_2)_6$—$Si(OMe)_3$ |
| III-5 | $(EtO)_3Si$—$(CH_2)_6$—$Si(OEt)_3$ |
| III-6 | $(MeO)_2MeSi$—$(CH_2)_{10}$—$SiMe(OMe)_2$ |
| III-7 | $(MeO)_3Si$—$(CH_2)_3$—NH—$(CH_2)_3$—$Si(OMe)_3$ |
| III-8 | $(MeO)_3Si$—$(CH_2)_3$—NH—$(CH_2)_2$—NH—$(CH_2)_3$—$Si(OMe)_3$ |
| III-9 | 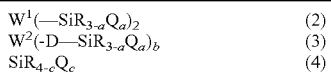 (MeO)$_3$Si—⟨phenyl⟩—Si(OMe)$_3$ |
| III-10 | (MeO)$_2$MeSi—⟨phenyl⟩—SiMe(OMe)$_2$ |
| III-11 | (EtO)$_3$Si—⟨phenyl⟩—Si(OEt)$_3$ |

TABLE 1-continued

| No. | Structural Formula |
|-----|-------------------|
| III-12 | 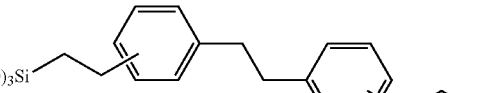 |
| III-13 |  |
| III-14 | 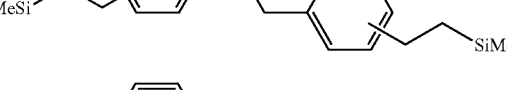 |
| III-15 | (MeO)$_3$SiC$_3$H$_6$—O—CH$_2$CH{—O—C$_3$H$_6$Si(OMe)$_3$}—CH$_2${—O—C$_3$H$_6$Si(OMe)$_3$} |
| III-16 | (MeO)$_3$SiC$_2$H$_4$—SiMe$_2$—O—SiMe$_2$—O—SiMe$_2$—C$_2$H$_4$Si(OMe)$_3$ |

Further, in formula (3), $W^2$ is not particularly limited. However, in particular embodiments, $W^2$ may be an organic group represented by formula (5):

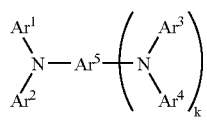

(5)

wherein $Ar^1$, $Ar^2$, $Ar^3$ and $Ar^4$, which may be the same or different, each represents a substituted or unsubstituted aryl group, $Ar^5$ represents a substituted or unsubstituted aryl or arylene group, k represents 0 or 1, and at least one of $Ar^1$ to $Ar^5$ has a bonding hand to connect with -D-SiR$_{3-a}$Q$_a$ in formula (3).

Combinations of $Ar^1$, $Ar^2$, $Ar^3$, $Ar^4$, $Ar^5$ and integer k in formula (5) and a group represented by -D-SiR$_{3-a}$Q$_a$ in formula (3) in particular exemplary embodiments are shown in FIG. 4; additional exemplary embodiments can be found in U.S. Patent Application Publication No. 2004/0086794, U.S. Pat. No. 6,730,448 and in U.S. Pat. No. 7,238,456 the entire disclosures of which are totally incorporated herein by reference. In FIG. 4, S represents -D-SiR$_{3-a}$Q$_a$ linked to $Ar^1$ to $Ar^5$.

Further, in embodiments, the silicon compounds represented by formula (4) may include silane coupling agents such as monofunctional alkoxysilanes (c=1), such as trimethylmethoxysilane; bifunctional alkoxysilanes (c=2), such as dimethyldimethoxysilane, diphenyldimethoxysilane or methylphenyldimethoxysilane; trifunctional alkoxysilanes (c=3), such as methyltrimethoxysilane, methyltriethoxysilane, ethyltrimethoxysilane, methyltrimethoxyethoxysilane, vinyltrimethoxysilane, vinyltriethoxysilane, phenyltrimethoxysilane, γ-glycidoxypropylmethyldiethoxysilane, γ-glycidoxypropyltrimethoxysilane, γ-glycidoxypropyltriethoxysilane, γ-aminopropyltriethoxysilane, γ-aminopropyltrimethoxysilane, γ-aminopropylmethyldimethoxysilane, N-β-(aminoethyl)-γ-aminopropyltriethoxysilane, (tridecafluoro-1,1,2,2-tetrahydrooctyl)triethoxysilane, (3,3,3-trifluoropropyl)trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane or 1H,1H,2H,2H-perfluorooctyltriethoxysilane; and tetrafunctional alkoxysilanes (c=4), such as tetramethoxysilane or tetraethoxysilane.

In order to improve the strength of the photosensitive layer, trifunctional alkoxysilanes and tetrafunctional alkoxysilanes may be used in embodiments, and in order to improve the flexibility and film-forming properties, monofunctional alkoxysilanes and bifunctional alkoxysilanes may be used in embodiments.

Silicone hard-coating agents containing these coupling agents can also be used in embodiments. Commercially available hard-coating agents include KP-85, X-40-9740 and X-40-2239 (available from Shinetsu Silicone Co., Ltd.), and AY42-440, AY42-441 and AY49-208 (available from Toray Dow Corning Co., Ltd.).

In embodiments, the silicon-containing layer may contain one or more of the silicon-containing compounds represented by formulas (2) to (4). Further, the compounds represented by formulas (2) to (4) may include monofunctional compounds (in which a or c is 1), bifunctional compounds (in which a or c is 2), trifunctional compounds (in which a or c is 3) and/or tetrafunctional compounds (in which a or c is 4). However, in particular embodiments, the number of silicon atoms derived from the silicon-containing compounds represented by formulas (2) to (4) in the silicon-containing layer satisfies equation (6):

$$(N_{a=3}+N_{c\geq3})/N_{total}\leq 0.5 \tag{6}$$

wherein $N_{a=3}$ represents the number of silicon atoms derived from —SiR$_{3-a}$Q$_a$ of the silicon-containing compound represented by formula (2) or (3), in which a is 3; $N_{c\geq3}$ represents the number of silicon atoms derived from the silicon-containing compound represented by formula (4) in which c is 3 or 4; and $N_{total}$ represents the total of the number of silicon atoms derived from —SiR$_{3-a}$Q$_a$ of the silicon compound represented by formula (2) or (3) and the number of silicon atoms derived from the silicon-containing compound represented by formula (4). That is, the ratio of silicon-containing compounds contained is set so that the number of silicon atoms derived from the trifunctional compound or the tetrafunctional compound becomes 0.5 or less based on the number of silicon atoms derived from the silicon-containing compounds represented by formulas (2) to (4) (in the case of the compound represented by formula (2) or (3), the silicon atoms are limited to ones derived from $-SiR_{3-a}Q_a$, and the same applies hereinafter). When the value of the left side of equation (6) exceeds 0.5, indistinct images may occur at high temperature and high humidity. When the value of the left side of equation (6) is decreased, a decrease in strength may also result. However, the use of a silicon-containing compound having two or more silicon atoms in its molecule can improve the strength.

In order to further improve the stain-adhesion resistance and lubricity of embodiments of photoreceptors, various fine particles can also be added to the silicon-containing layer. Non-limiting examples of suitable fine particles for use in embodiments include fine particles containing silicon, such as fine particles containing silicon as a constituent element, and specifically include colloidal silica and fine silicone particles. Fine particles may be used either alone or as a combination of two or more of such fine particles.

Colloidal silica used in embodiments as the fine particles containing silicon may be selected from acidic or alkaline aqueous dispersions of fine particles having an average particle size in a range of from about 1 to about 100 nm, such as about 10 to about 30 nm, and dispersions of fine particles in organic solvents, such as an alcohol, a ketone or an ester. In general, commercially available particles may be used. There is no particular limitation on the solid content of colloidal silica in a top surface layer of the photoreceptor of embodiments. However, in embodiments, colloidal silica is used within the range of from about 1 to about 50% by weight, such as from about 5 to about 30% by weight, based on the total solid content of the top-surface layer, in terms of film-forming properties, electric characteristics and strength.

Fine silicone particles that may be used as fine particles containing silicon in embodiments may be selected from silicone resin particles, silicone rubber particles and silica particles surface-treated with silicone. Such particles may be spherical and may have an average particle size in a range of from about 1 to about 500 nm, such as from about 10 to about 100 nm. In general, commercially available particles maybe used in embodiments.

In embodiments, the fine silicone particles are small-sized particles that are chemically inactive and excellent in dispersibility in a resin, and further are low in content as may be necessary for obtaining sufficient characteristics. Accordingly, the surface properties of exemplary photoreceptors can be improved without inhibition of the cross-linking reaction. That is, fine silicone particles improve the lubricity and water repellency of photoreceptor surfaces where incorporated into strong cross-linked structures, which may then be able to maintain good wear resistance and stain-adhesion resistance for a long period of time. The content of the fine silicone particles in the silicon-containing layer of embodiments may be within the range of from about 0.1 to about 20% by weight, such as from about 0.5 to about 10% by weight, based on the total solid content of the silicon-containing layer.

Other fine particles that may be used in embodiments include fine fluorine-based particles, such as ethylene tetrafluoride, ethylene trifluoride, propylene hexafluoride, vinyl fluoride and vinylidene fluoride, and semiconductive metal oxides such as $ZnO-Al_2O_3$, $SnO_2-Sb_2O_3$, $In_2O_3-SnO_2$, $ZnO-TiO_2$, $MgO-Al_2O_3$, $FeO-TiO_2$, $TiO_2$, $SnO_2$, $In_2O_3$, $ZnO$ and $MgO$.

In conventional photoreceptors, when such fine particles are contained in the photosensitive layer, the compatibility of the fine particles with a charge-transfer substance or a binding resin may become insufficient, which causes layer separation in the photosensitive layer and thus formation of an opaque film. As a result, the electric characteristics have deteriorated in some cases. In contrast, the silicon compound-containing layer of embodiments, such as for example a charge-transfer layer, may contain the resin soluble in the liquid component in the coating solution used for formation of this layer and the silicon compound, thereby improving the dispersibility of the fine particles in the silicon compound-containing layer. Accordingly, the pot life of the coating solution can be sufficiently prolonged, and it becomes possible to prevent deterioration of the electric characteristics.

Further, an additive such as a plasticizer, a surface modifier, an antioxidant, or an agent for preventing deterioration by light may also be included in the silicon compound-containing layer of embodiments. Non-limiting examples of plasticizers that may be used in embodiments include, for example, biphenyl, biphenyl chloride, terphenyl, dibutyl phthalate, diethylene glycol phthalate, dioctyl phthalate, triphenylphosphoric acid, methylnaphthalene, benzophenone, chlorinated paraffin, polypropylene, polystyrene and various fluorohydrocarbons.

The antioxidants may include an antioxidant having a hindered-phenol, hindered-amine, thioether or phosphite partial structure. Suitable antioxidants include antioxidants having hindered-phenol, hindered-amine, thioether or phosphite partial structures, which may improve potential stability and image quality in environmental variation. Suitable hindered-phenol antioxidants for use in embodiments include SUMILIZER BHT-R, SUMILIZER MDP-S, SUMILIZER BBM-S, SUMILIZER WX-R, SUMILIZER NW, SUMILIZER BP-76, SUMILIZER BP-101, SUMILIZER GA-80, SUMILIZER GM and SUMILIZER GS (available from Sumitomo Chemical Co., Ltd.); IRGANOX 1010, IRGANOX 1035, IRGANOX 1076, IRGANOX 1098, IRGANOX 1135, IRGANOX 1141, IRGANOX 1222, IRGANOX 1330, IRGANOX 1425WLj, IRGANOX 1520Lj, IRGANOX 245, IRGANOX 259, IRGANOX 3114, IRGANOX 3790, IRGANOX 5057 and IRGANOX 565 (available from Ciba Specialty Chemicals); and ADECASTAB AO-20, ADECASTAB AO-30, ADECASTAB AO-40, ADECASTAB AO-50, ADECASTAB AO-60, ADECASTAB AO-70, ADECASTAB AO-80 and ADECASTAB AO-330i (available from Asahi Denka Co., Ltd.). Suitable hindered-amine antioxidants that may be used in embodiments include SANOL LS2626, SANOL LS765, SANOL LS770, SANOL LS744, TINUVIN 144, TINUVIN 622LD, MARK LA57, MARK LA67, MARK LA62, MARK LA68, MARK LA63 and SUMILIZER TPS; and suitable phosphite antioxidants that may be used in embodiments include MARK 2112, MARK PEP-8, MARK PEP-24G, MARK PEP-36, MARK 329K and MARK HP-10. In particular embodiments, the antioxidant is one or more antioxidant chosen from hindered-phenol and hindered-amine antioxidants.

A siloxane-containing antioxidant may also be incorporated into the silicon-containing layer of embodiments. In certain embodiments, the siloxane-containing antioxidant may be wholly or at least partially located in the siloxane region of the silicon-containing layer. The siloxane-containing antioxidants may include any siloxane-containing antioxidant having a hindered-phenol, hindered-amine, thioether or phosphite partial structure. Use of siloxane-containing antioxidants having a hindered-phenol, hindered-amine, thioether or phosphite partial structure, as described herein, has been found to drastically improve image-deletion error even in long-term cycling under conditions of high humidity and high temperature. Suitable siloxane-containing antioxidants that may be used in accordance with embodiments can be found in U.S. patent application Ser. No. 10/998,585.

There is no particular limitation on the thickness of the silicon-containing layer, however, in embodiments, the silicon-containing layer may be in a range from about 2 to about 5 µm in thickness, such as from about 2.7 to about 3.2 µm in thickness.

The photoreceptor of embodiments may be either a function-separation-type photoreceptor, in which a layer containing a charge-generation substance (charge-generation layer) and a layer containing a charge-transfer substance (charge-transfer layer) are separately provided, or a monolayer-type photoreceptor, in which both the charge-generation layer and the charge-transfer layer are contained in the same layer, as long as the photoreceptor of the particular embodiment has the photosensitive layer provided with the above-mentioned silicon compound-containing layer. The photoreceptor of embodiments will be described in greater detail below, taking the function-separation-type photoreceptor as an example.

FIG. 1 is a cross-sectional view schematically showing an embodiment of a photoreceptor. Photoreceptor 1 shown in FIG. 1 is a function-separation-type photoreceptor in which charge-generation layer 13 and charge-transfer layer 14 are separately provided. That is, underlayer 12, charge-generation layer 13, charge-transfer layer 14 and protective layer 15 are laminated onto conductive support 11 to form photosensitive layer 16. Protective layer 15 contains a resin soluble in the liquid component contained in the coating solution used for formation of this layer and the silicon compound.

Conductive support 11 may include, for example, a metal plate, a metal drum or a metal belt using a metal, such as aluminum, copper, zinc, stainless steel, chromium, nickel, molybdenum, vanadium, indium, gold, platinum or an alloy thereof; and paper or a plastic film or belt coated, deposited or laminated with a conductive polymer, a conductive compound such as indium oxide, or a metal such as but not limited to aluminum, titanium, zirconium, palladium, gold, or an alloy thereof. Further, surface treatment (such as anodic oxidation coating, hot water oxidation, chemical treatment, or coloring) or diffused reflection treatment (such as graining) can also be applied to a surface of support 11.

Binding resins used in underlayer 12 of embodiments may include but are not limited to, one or more polyamide resins, vinyl chloride resins, vinyl acetate resins, phenol resins, polyurethane resins, melamine resins, benzoguanamine resins, polyimide resins, polyethylene resins, polypropylene resins, polycarbonate resins, acrylic resins, methacrylic resins, vinylidene chloride resins, polyvinyl acetal resins, vinyl chloride-vinyl acetate copolymers, polyvinyl alcohol resins, water-soluble polyester resins, nitrocelluloses, caseins, gelatins, polyglutamic acids, starches, starch acetates, amino starches, polyacrylic acids, polyacrylamides, zirconium chelate compounds, titanyl chelate compounds, titanyl alkoxide compounds, organic titanyl compounds, silane coupling agents and mixtures thereof. Further, fine particles of titanium oxide, aluminum oxide, silicon oxide, zirconium oxide, barium titanate, a silicone resin or the like may be added to the above-mentioned binding resin in embodiments.

As a coating method in forming the underlayer of embodiments, any ordinary method, such as blade coating, Mayer bar coating, spray coating, dip coating, bead coating, air knife coating or curtain coating may be employed. The thickness of the underlayer may be from about 0.01 to about 40 µm in embodiments.

Non-limiting examples of charge-generation substances that may be contained in charge-generation layer 13 of embodiments include, but are not limited to, various organic pigments and organic dyes; such as azo pigments, quinoline pigments, perylene pigments, indigo pigments, thioindigo pigments, bisbenzimidazole pigments, phthalocyanine pigments, quinacridone pigments, quinoline pigments, lake pigments, azo lake pigments, anthraquinone pigments, oxazine pigments, dioxazine pigments, triphenylmethane pigments, azulenium dyes, squalium dyes, pyrylium dyes, triallylmethane dyes, xanthene dyes, thiazine dyes and cyanine dyes; and inorganic materials such as amorphous silicon, amorphous selenium, tellurium, selenium-tellurium alloys, cadmium sulfide, antimony sulfide, zinc oxide and zinc sulfide. In embodiments, cyclo-condensed aromatic pigments, perylene pigments and azo pigments may be used to impart sensitivity, electric stability and photochemical stability against irradiated light. These charge-generation substances may be used either alone or as a combination of two or more.

In embodiments, charge-generation layer 13 may be formed by vacuum deposition of the charge-generation substance or application of a coating solution in which the charge-generation substance is dispersed in an organic solvent containing a binding resin. The binding resins used in the charge-generation layer of embodiments include polyvinyl acetal resins such as polyvinyl butyral resins, polyvinyl formal resins or partially acetalized polyvinyl acetal resins in which butyral is partially modified with formal or acetoacetal, polyamide resins, polyester resins, modified-ether-type polyester resins, polycarbonate resins, acrylic resins, polyvinyl chloride resins, polyvinylidene chlorides, polystyrene resins, polyvinyl acetate resins, vinyl chloride-vinyl acetate copolymers, silicone resins, phenol resins, phenoxy resins, melamine resins, benzoguanamine resins, urea resins, polyurethane resins, poly-N-vinylcarbazole resins, polyvinylanthracene resins, polyvinylpyrene resins and mixtures thereof. In embodiments in which one or more of polyvinyl acetal resins, vinyl chloride-vinyl acetate copolymers, phenoxy resins or modified ether type polyester resins are used, the dispersibility of the charge-generation substance may be improved to cause no occurrence of coagulation of the charge-generation substance, and a coating solution that is stable for a long period of time may be obtained. The use of such a coating solution in embodiments makes possible the formation of a uniform coating easily and surely. As a result, the electric characteristics may be improved, and image defects may be prevented. Further, the compounding ratio of the charge-generation substance to the binding resin may be, in embodiments, within the range of from about 5:1 to about 1:2 by volume ratio.

Further, the solvents used in preparing the coating solution of embodiments may include organic solvents such as methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride, chloroform and mixtures thereof.

Methods for applying the coating solution in embodiments include the coating methods described above with reference to the underlayer. The thickness of charge-generation layer 13 thus formed may be from about 0.01 to about 5 µm, such as from about 0.1 to about 2 µm. When the thickness of charge-generation layer 13 is less than about 0.01 µm, uniform layer formation may be difficult. On the other hand, when the thickness exceeds about 5 µm, the electrophotographic characteristics may significantly deteriorate.

Further, a stabilizer such as an antioxidant or an inactivating agent may also be added to charge-generation layer 13 in embodiments. Non-limiting examples of antioxidants that may be used include but are not limited to antioxidants such as phenolic, sulfur, phosphorus and amine compounds, as well as the antioxidant compounds described above. Inactivating agents that may be used in embodiments may include bis(dithiobenzyl)nickel and nickel di-n-butylthiocarbamate.

In embodiments, charge-transfer layer 14 can be formed by applying a coating solution containing the charge-transfer substance and a binding resin, and further fine particles, an additive, etc., as described above.

Low molecular-weight charge-transfer substances that may be used in embodiments may include, for example, pyrene, carbazole, hydrazone, oxazole, oxadiazole, pyrazoline, arylamine, arylmethane, benzidine, thiazole, stilbene and butadiene compounds. In embodiments, high molecular-weight charge-transfer substances may be used and include, for example, poly-N-vinylcarbazoles, poly-N-vinylcarbazole halides, polyvinyl pyrenes, polyvinylanthracenes, polyvinylacridines, pyrene-formaldehyde resins, ethylcarbazole-formaldehyde resins, triphenylmethane polymers and polysilanes. Triphenylamine compounds, triphenylmethane compounds and benzidine compounds may be used in embodiments to promote mobility, stability and transparency to light. Further, silicon compounds represented by formula (3) may also be used as charge-transfer substances in particular embodiments.

Other exemplary charge-transfer molecules include, but are not limited to, the various compounds identified above as the organic group $W^2$, which have hole-transport capability. In particular embodiments, the charge-transfer molecule is the arylamine of formula (7):

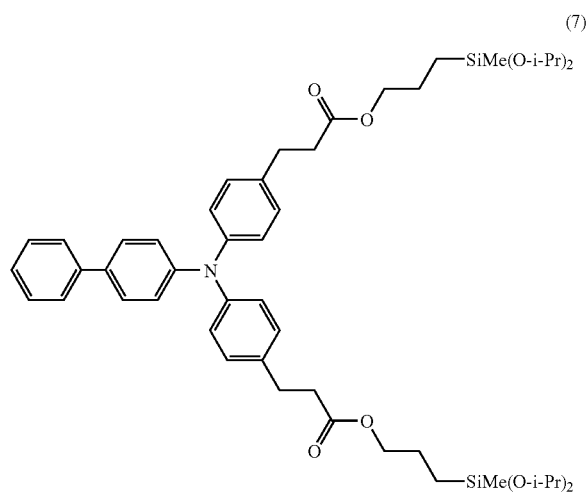

(7)

As binding resins in embodiments, high molecular-weight polymers that can form an electrical insulating film may be used. For example, polyvinyl acetal resins, polyamide resins, cellulose resins, phenol resins, etc., which are soluble in alcoholic solvents, may be used with binding resins including, for example, polycarbonates, polyesters, methacrylic resins, acrylic resins, polyvinyl chlorides, polyvinylidene chlorides, polystyrenes, polyvinyl acetates, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazoles, polyvinyl butyrals, polyvinyl formals, polysulfones, casein, gelatin, polyvinyl alcohols, phenol resins, polyamides, carboxymethyl celluloses, vinylidene chloride-based polymer latexes and polyurethanes. Of the above-mentioned high molecular-weight polymers, polycarbonates, polyesters, methacrylic resins and acrylic resins have excellent compatibility with the charge-transfer substance, solubility and strength.

Charge-transfer layer 14 of embodiments may further contain an additive such as a plasticizer, a surface modifier, an antioxidant or an agent for preventing deterioration by light.

The thickness of charge-transfer layer 14 may be, in embodiments, in a range of from about 5 to about 50 μm, such as from about 10 to about 40 μm. When the thickness of the charge-transfer layer is less than about 5 μm, charging becomes difficult. However, thicknesses exceeding about 50 μm result significant deterioration of the electrophotographic characteristics.

Protective layer 15 may contain, in embodiments, resins soluble in liquid components in coating solution used for formation of protective layers and silicon compounds as described above. Protective layer 15 may further contain a lubricant or fine particles of silicone oils or fluorine materials, which can also improve lubricity and strength. Non-limiting examples of the lubricants that may be used in embodiments include the above-mentioned fluorine-based silane coupling agents. Fine particles to be dispersed in protective layer 15 of embodiments may include fine particles comprising resins obtained by copolymerizing fluororesins with hydroxyl group-containing monomers and semiconductive metal oxides, as well as the above-mentioned fine silicone particles and fine fluorine-based particles. The thickness of the protective layer may be, in embodiments, in a range of from about 0.1 to about 10 μm, such as from about 0.5 to about 7 μm.

In general, silicon-containing protective or overcoat layers are prepared by sol-gel polymerization of silicon-containing materials. However, when these sol-gel materials are cured, void volumes are known to form. These void volumes may be a result of factors including film shrinkage known to occur during curing or sintering of sol-gel materials. Void volumes may cause problems and errors in image formation, such as image-deletion errors, especially under conditions of high temperature and high humidity. Furthermore, void volumes may decrease the mechanical robustness of the silicon-containing protective or overcoat layers.

However, in embodiments disclosed and contemplated herein, interpenetrating networks are prepared by combining of polymeric binder materials with the silicon-containing materials. The polymeric binder materials fill the void volumes that form during the curing of sol-gel systems, which may allow severe image-deletion errors to be corrected, particularly under high-temperature, high-humidity conditions. Thus, in embodiments, interpenetrating networks include combinations of silicon-containing materials and polymeric binder materials.

In embodiments, interpenetrating networks may be prepared by reacting polymeric binder materials with organic siloxane materials. The organic siloxane materials of embodiments may be prepared by sol-gel polymerization of functionalized-organosiloxane materials.

Suitable organic siloxane materials for use in embodiments include, but are not limited to, those set forth above. In particular embodiments may include silicon-containing materials having reactive functional groups, such as, reactive double bonds.

Suitable polymeric binder materials for use in embodiments include, for example polymeric binder materials having pendant reactive functional groups. The monomers than can be used to form the polymeric binder materials can be any of various monomers capable of undergoing a free radical polymerization, and include, but are not limited to, styrene, substituted styrene and derivatives thereof such as methylstyrene, acrylates, methacrylates, butadiene, isoprene, myrcene, conjugated dienes and derivatives thereof, ethylene and derivatives thereof, mixtures thereof, and the like. Any of these monomers, or prepolymers or polymers formed therefrom, can have suitable functional groups attached to the polymer chain, suich as pendant from the chain or as terminal units on the chain.

Suitable polymeric binder materials may include materials having reactive functional groups that are capable of reacting with the reactive functional groups included in the silicon-containing materials. The reactive functional group, which is a terminal group in some embodiments, may be the residue of a stable free-radical agent used to form the prepolymer or polymer by a stable free-radical polymerization process. Such stable free-radical polymerization (SFRP) processes are known in the art, such as described in U.S. Pat. No. 5,322,912, the entire disclosure of which is totally incorporated herein by reference. In the SFRP processes, propagating chains of the polymer are referred to as "pseudo-living" because the stable free-radical agent adds to a propagating chain and the chain is temporarily, but reversibly, terminated.

Suitable polymeric binder materials for use in embodiments include, for example polymeric binder materials having pendant or terminal reactive functional groups. Such suitable polymeric binder materials may include materials having reactive functional group, which are capable of reacting with the reactive functional groups included in the silicon-containing materials. The reactive functional group, which is a terminal group in some embodiments, may be chosen from the group consisting of organic radicals having in series a carbon atom directly bonded to an oxygen atom that is then in turn directly bonded to a nitrogen atom. The nitrogen atom of such organic radicals may be optionally substituted with hydrocarbon groups, which may form either saturated or unsaturated hydrocarbon rings. Such organic radicals are known to be thermolytically unstable and to disassociate into carbon-centered radicals and oxygen-centered radicals on heating.

In embodiments, suitable stable free-radical agents that can be used to provide terminal functional groups include nitroxide stable free-radical agents, such as PROXYL (2,2,5,5-tetramethyl-1-pyrrolidinyloxy) and derivatives thereof, TEMPO (2,2,6,6-tetramethyl-1-piperidinyloxy) and derivatives thereof, DOXYL (4,4-dimethy-1-oxazolidinyloxy) and derivatives thereof, mixtures of such nitroxide stable free-radical agents and the like. Derivatives of these compounds can include, for example, epoxy groups, thiirane groups, isocyanate groups, isothiocyanate groups, halogen groups, imine groups, oxygen groups, hydroxyl groups, and the like. For example, oxo-TEMPO is the compound 2,2,4,4-tetramethyl-4-oxo-1-piperidinyloxy, and hydroxyl-TEMPO is the compound 2,2,4,4-tetramethyl-4-hydroxy-1-piperidinyloxy. These stable free-radical agent materials are well known in the literature as free-radical polymerization inhibitors, for example as described in G. Moad et. al., *Tetrahedron Letters*, 22, 1165 (1981). However, under the polymerization conditions of the instant disclosure, the stable free-radical agents function as moderators to harness the normally highly reactive and indiscriminate intermediate free-radical species. TEMPO and hydroxyl-TEMPO groups are shown below as formulas (8) and (9), respectively.

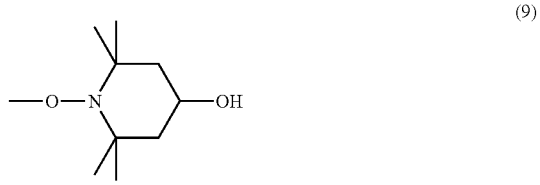

For example, TEMPO-terminated acrylates may be prepared by polymerizing suitable acrylates in the presence of a suitable radical initiator and a suitable nitroxide compound to form nitroxide-terminated polyacrylates. The propagating polymer fluctuates, or is in equilibrium between, being temporarily terminated or suspended (having a terminal nitroxide group) and being alive or living (having a terminal carbon-centered radical). As thermal energy is supplied from the reaction system to the bond joining the growing polymeric chain and the stable free-radical agent, the covalent bond to the propagating chain is homolytically cleaved. This hemolytic bond cleavage temporarily generates a living chain-end radical species and permits another monomer unit to insert or add to the chain. The living chain, which may be short-lived (as determined by diffusion control), is terminated or protected by the stable free-radical agent as a thermally labile adduct above about 80 to 100° C. or latent free-radical chain. The free-radical initiator, such as benzoyl peroxide, used to begin the SFRP process, is typically attached as a residue to the opposite terminal end of the polymer chain.

Polymeric binder materials of embodiments should be chosen to be reactive towards the organic siloxane materials containing reactive double bonds during curing, such as at the curing temperatures of the organic siloxane materials, which may be, for example, about 130° C. The polymeric binder materials should also be chosen to include hydrophobic regions that are compatible with the hole-transporting moieties within the organic siloxane materials. In addition, the polymeric binder materials should be chosen to include reactive groups that are either pendant to or present at the terminus of the polymeric backbone, so that these reactive groups are available for further reaction to form the interpenetrating networks. Finally, the polymeric binder materials should be in either a liquid form or in a rubber-like form at the temperatures required for curing the organic siloxane materials, so that the polymeric binder materials flow and fill voids in these organic siloxane materials during curing. For example, a nitroxide stable free-radical agent-terminated polymeric binder material, such as a TEMPO-terminated polymeric binder material, may be reacted with a organic siloxane material containing a reactive double bond that has been prepared by sol-gel polymerization. In such embodiments, the nitroxide stable free-radical agent-terminated polymeric binder material may react with reactive double bonds in the organic siloxane material to form an interpenetrating network.

In embodiments, the polymeric binder materials may be TEMPO-terminated acrylate materials. In particular embodiments, TEMPO-terminated acrylates, such as TEMPO-terminated poly(butylacrylate), may be included because such materials have low glass-transition temperatures and thus easily flow at the temperatures used to cure siloxane-containing overcoat layers, such as for example 130° C. This flowability allows such TEMPO-terminated acrylates to fill voids in siloxane-containing layers, which are formed by sol-gel polymerization processes, and form the interpenetrating network. In addition, the TEMPO group, which is known to be activated at temperatures of about 110° C., may be reactive, allowing binding into the siloxane-containing overcoat layers.

This polymer-forming process is commonly performed in solutions of monomer in inert solvent; in the bulk, in which liquid monomer acts as its own polymerization solvent (typically polymerizations are carried out under these conditions due to low monomer conversion); or as a suspension or dispersion in water, in which the monomer is dispersed in water through the use of a suitable surfactant and addition of suitable energy for homogenization. A nitroxide-terminated polymer produced by such a process will have the added advantage that the same polymer can be made to react or "come alive" on heating to about or above 80 to 100° C. at a later time. This heating can take place in a suitable reactor in the presence of suitable monomers to add additional polymer units onto the existing polymer. Alternatively, this heating can take place in the solid state in the presence of suitable reactive molecules or moieties, such as, for example, carbon-carbon double bonds. In some embodiments, the suitable quantities of carbon-carbon double bonds are chemically bound into siloxane-containing overcoat layers that contain TEMPO-terminated acrylate polymers, resulting in interpenetrating networks of siloxane-containing material and acrylate polymer.

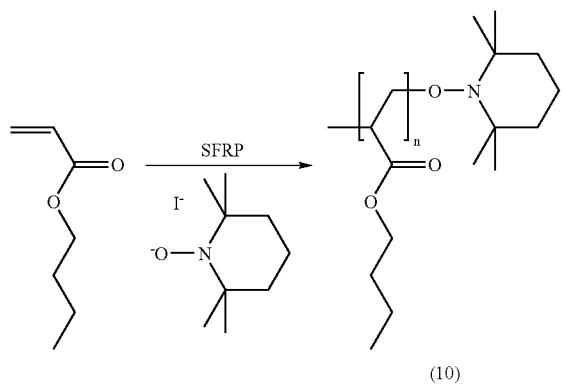

(10)

Such TEMPO-terminated acrylates may be used to form interpenetrating networks with functionalized siloxane-containing acrylates. Such siloxane-containing acrylates may be prepared by reacting a metal acrylate with 3-iodopropylmethyldiisopropoxysilane. For example, sodium acrylate may be reacted with 3-iodopropylmethyldiisopropoxysilane in N,N-dimethylformamide (DMF) to form silylated-acrylate compound (11), as shown below.

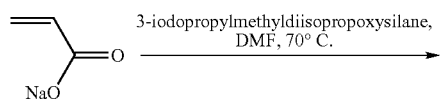

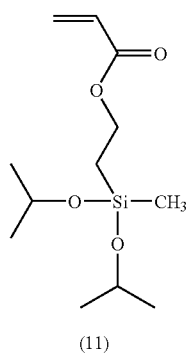

(11)

In exemplary embodiments, reactive-functional-group-terminated siloxane-containing acrylates with pendant acrylate groups are used to form an interpenetrating network with siloxane-containing materials. Such acrylates may be prepared by first reacting sodium acrylate with a siloxane precursor. The siloxane acrylate may then be reacted with to incorporate a reactive functional group at the polymer terminus. For example, an interpenetrating network prepared from compounds (10) and (11) may be formed by preparing a sol-gel layer including compounds (10) and (11), and curing the layer.

The photoreceptor of embodiments should not be construed as being limited to the above-mentioned constitution. For example, the photoreceptor shown in FIG. 1 is provided with protective layer 15. However, when charge-transfer layer 14 contains the resin soluble in the liquid component in the coating solution used for formation of this layer and the silicon compound, charge-transfer layer 14 may be used as a top surface layer (a layer on the side farthest apart from support 11) without using protective layer 15. In some embodiments, the charge-transfer substance contained in charge-transfer layer 14 may be soluble in the liquid component in the coating solution used for formation of charge-transfer layer 14.

Image-Forming Apparatus and Process Cartridge

Figure 2:
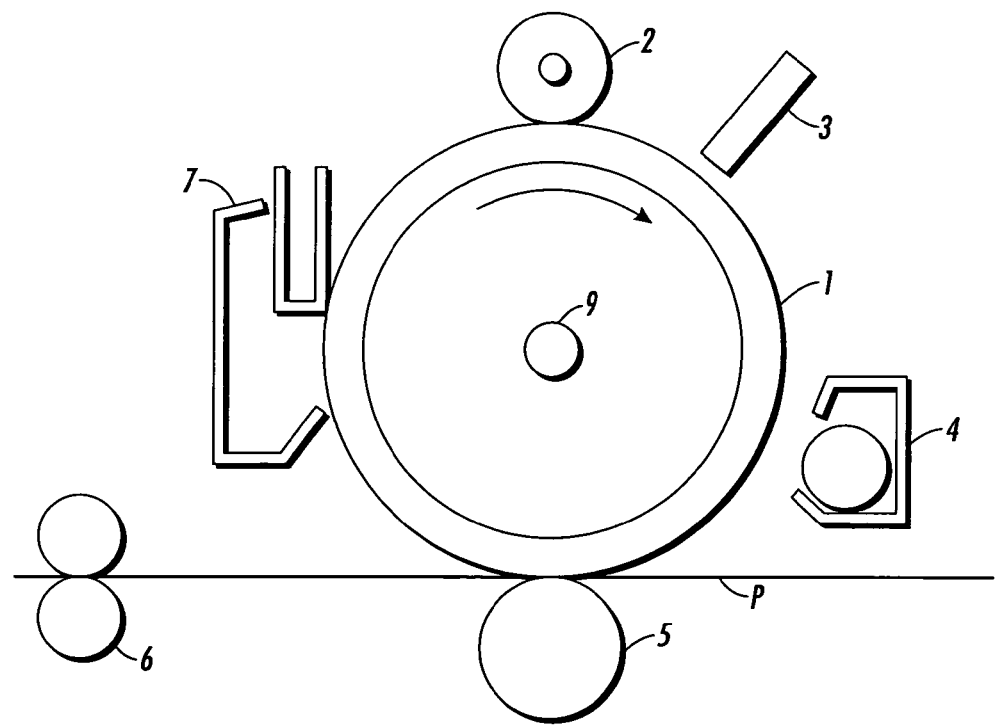
FIG. 2 is a schematic view showing an embodiment of an image-forming apparatus.

FIG. 2 is a schematic view showing an embodiment of an image-forming apparatus. In the apparatus shown in FIG. 2, photoreceptor 1 constituted as shown in FIG. 1 is supported by support 9, and rotatable at a specified rotational speed in the direction indicated by the arrow, centered on support 9. Contact-charging device 2, exposure device 3, developing device 4, transfer device 5 and cleaning unit 7 are arranged in this order along the rotational direction of photoreceptor 1. Further, this exemplary apparatus is equipped with image-fixing device 6, and medium P to which a toner image is to be transferred is conveyed to image-fixing device 6 through transfer device 5.

Contact-charging device 2 has a roller-shaped contact charging member. The contact-charging member is arranged so that it comes into contact with a surface of the photoreceptor 1, and a voltage is applied, thereby being able to give a specified potential to the surface of photoreceptor 1. In embodiments, a contact-charging member may be formed from a metal, such as aluminum, iron or copper; a conductive polymer material, such as a polyacetylene, a polypyrole or a polythiophene; or a dispersion of fine particles of carbon black, copper iodide, silver iodide, zinc sulfide, silicon carbide, a metal oxide or the like, in an elastomer material, such as polyurethane rubber, silicone rubber, epichlorohydrin rubber, ethylene-propylene rubber, acrylic rubber, fluororubber, styrene-butadiene rubber or butadiene rubber. Non-limiting examples of metal oxides that may be used in embodiments include ZnO, $SnO_2$, $TiO_2$, $In_2O_3$, $MoO_3$ and complex oxides thereof. Further, a perchlorate may be added to the elastomer material to impart conductivity.

Further, a covering layer may also be provided on a surface of the contact-charging member of embodiments. Non-limiting examples of materials that may be used in embodiments for forming a covering layer include N-alkoxy-methylated nylon, cellulose resins, vinylpyridine resins, phenol resins, polyurethanes, polyvinyl butyrals, melamines and mixtures thereof. Furthermore, emulsion resin materials such as acrylic resin emulsions, polyester resin emulsions or polyurethanes, may be used. In order to further adjust resistivity, conductive agent particles may be dispersed in these resins, and in order to prevent deterioration, an antioxidant can also be added thereto. Further, in order to improve film-forming properties in forming the covering layer, a leveling agent or a surfactant may be added to the emulsion resin in embodiments.

The resistance of the contact-charging member of embodiments may be in a range of from about $10^0$ to about $10^{14}$ $\Omega$-cm, such as from about $10^2$ to about $10^{12}$ $\Omega$-cm. When a voltage is applied to this contact-charging member, either a DC (direct current) voltage or an AC (alternating current) voltage can be used as the applied voltage. Further, a superimposed voltage of a DC voltage and an AC voltage can also be used.

In the exemplary apparatus shown in FIG. 2, the contact-charging member of contact-charging device 2 is in the shape of a roller. However, such a contact-charging member may be in the shape of a blade, a belt, a brush or the like.

Further, in embodiments an optical device that can perform desired imagewise exposure to a surface of photoreceptor 1 with a light source such as a semiconductor laser, an LED (light-emitting diode) or a liquid-crystal shutter, may be used as exposure device 3.

Furthermore, a known developing device using a normal or reversal developing agent of a one-component system, a two-component system or the like may be used in embodiments as developing device 4. There is no particular limitation on toners that may be used in embodiments.

Contact-type transfer-charging devices using a belt, a roller, a film, a rubber blade or the like, or a scorotron-transfer charger or a corotron-transfer charger utilizing corona discharge may be employed as transfer device 5, in various embodiments.

Further, in embodiments, cleaning device 7 may be a device for removing a remaining toner adhered to the surface of photoreceptor 1 after a transfer step, and photoreceptor 1 repeatedly subjected to the above-mentioned image-formation process may be cleaned thereby. In embodiments, cleaning device 7 may be a cleaning blade, a cleaning brush, a cleaning roll or the like. Materials for the cleaning blade include urethane rubber, neoprene rubber and silicone rubber.

In the exemplary image-forming device shown in FIG. 2, the respective steps of charging, exposure, development, transfer and cleaning are conducted in turn in the rotation step of photoreceptor 1, thereby repeatedly performing image formation. Thus, photoreceptors having excellent discharge-gas resistance, mechanical strength, scratch resistance, particle dispersibility, etc., may be provided. Accordingly, even in embodiments in which the photoreceptor is used together with the contact-charging device or the cleaning blade, or further with spherical toner obtained by chemical polymerization, good image quality can be obtained without the occurrence of image defects such as fogging. That is, embodiments provide image-forming apparatuses that can stably provide good image quality for a long period of time is realized.

Figure 3:
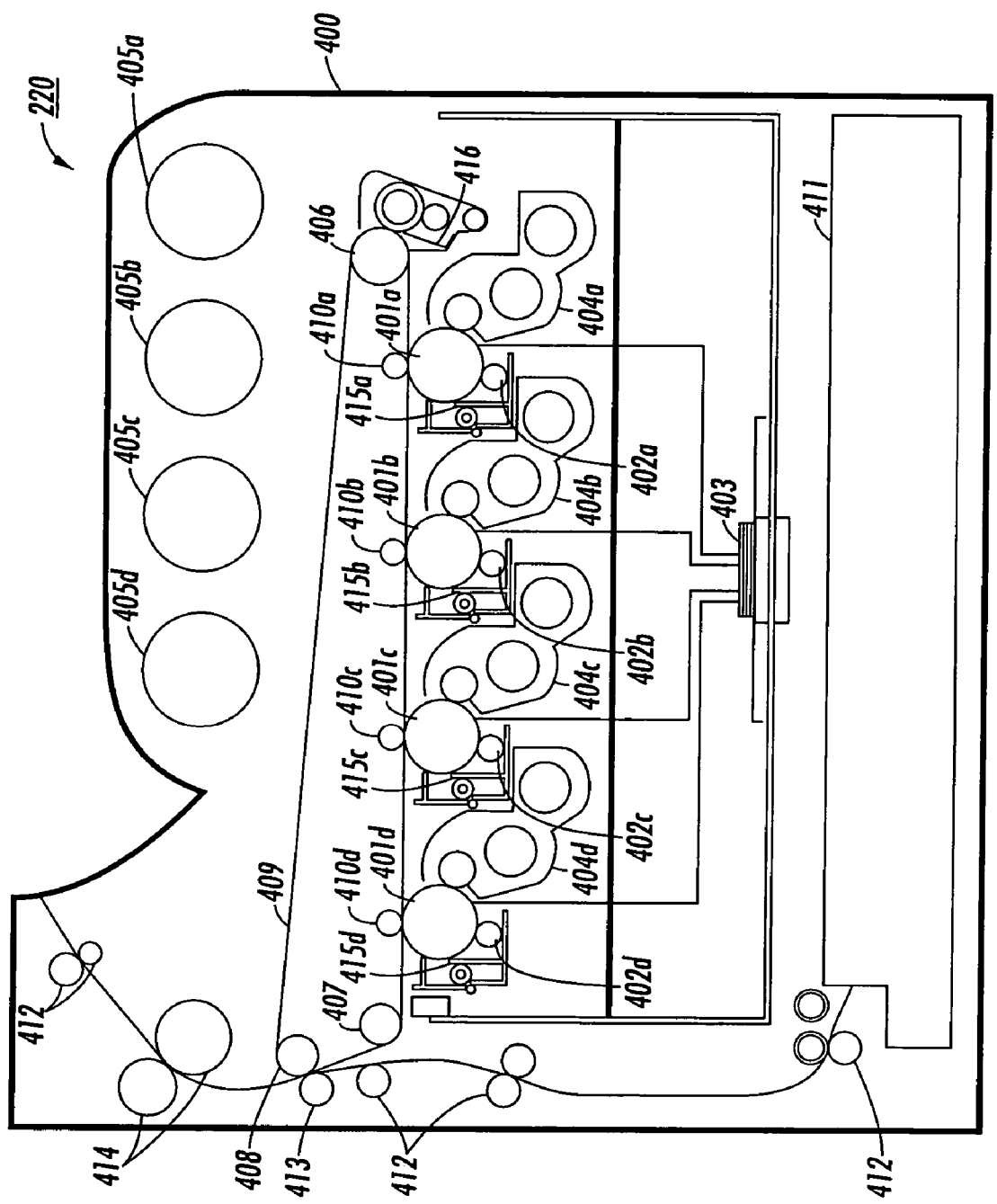
FIG. 3 is a schematic view showing another embodiment of an image-forming apparatus.

FIG. 3 is a cross sectional view showing another exemplary embodiment of an image-forming apparatus. Image-forming apparatus 220 shown in FIG. 3 is an image-forming apparatus of an intermediate-transfer system, and four photoreceptors 401*a* to 401*d* are arranged in parallel with each other along intermediate-transfer belt 409 in housing 400.

Here, photoreceptors 401*a* to 401*d* carried by image forming apparatus 220 are each photoreceptors of embodiments. Each of photoreceptors 401*a* to 401*d* may rotate in a predetermined direction (counterclockwise on the sheet of FIG. 3), and charging rolls 402*a* to 402*d*, developing device 404*a* to 404*d*, primary transfer rolls 410*a* to 410*d* and cleaning blades 415*a* to 415*d* are each arranged along the rotational direction thereof. In each of developing devices 404*a* to 404*d*, four-color toners of yellow (Y), magenta (M), cyan (C) and black (B) contained in toner cartridges 405*a* to 405*d* can be supplied, and primary transfer rolls 410*a* to 410*d* are each brought into abutting contact with photoreceptors 401*a* to 401*d* through intermediate-transfer belt 409.

Further, laser-light source (exposure unit) 403 is arranged at a specified position in housing 400, and it is possible to irradiate surfaces of photoreceptors 401*a* to 401*d* after charging with laser light emitted from laser-light source 403. This performs the respective steps of charging, exposure, development, primary transfer and cleaning in turn in the rotation step of photoreceptors 401*a* to 401*d*, and toner images of the respective colors are transferred onto intermediate-transfer belt 409, one over the other.

Intermediate-transfer belt 409 is supported with driving roll 406, backup roll 408 and tension roll 407 at a specified tension, and rotatable by the rotation of these rolls without the occurrence of deflection. Further, secondary transfer roll 413 is arranged so that it is brought into abutting contact with backup roll 408 through intermediate-transfer belt 409. Intermediate-transfer belt 409, which has passed between backup roll 408 and secondary transfer roll 413, is cleaned up by cleaning blade 416, and then repeatedly subjected to the subsequent image-formation process.

Further, tray 411, for providing a medium such as paper to which a toner image is to be transferred, is provided at a specified position in housing 400. The medium to which the toner image is to be transferred in tray 411 is conveyed in turn between intermediate-transfer belt 409 and secondary transfer roll 413, and further between two fixing rolls 414 brought into abutting contact with each other, with conveying roll 412, and then delivered out of housing 400.

According to exemplary image-forming apparatus 220 shown in FIG. 3, the use of photoreceptors of embodiments as photoreceptors 401*a* to 401*d* may achieve discharge-gas resistance, mechanical strength, scratch resistance, etc. on a sufficiently high level in the image-formation process of each of photoreceptors 401*a* to 401*d*. Accordingly, even when the photoreceptors are used together with the contact-charging devices or the cleaning blades, or further with the spherical toner obtained by chemical polymerization, good image quality can be obtained without the occurrence of image defects such as fogging. Therefore, also according to the image-forming apparatus for color-image formation using the intermediate-transfer body, such as this embodiment, the image-forming apparatus which can stably provide good image quality for a long period of time is realized.

The above-mentioned embodiments should not be construed as limiting. For example, each apparatus shown in FIGS. 2 or 3 may be equipped with a process cartridge comprising photoreceptor 1 (or photoreceptors 401a to 401d) and charging device 2 (or charging devices 402a to 402d). The use of such a process cartridge allows maintenance to be performed more simply and easily.

Further, in embodiments, when a charging device of the non-contact-charging system such as a corotron charger is used in place of contact-charging device 2 (or contact charging devices 402a to 402d), sufficiently good image quality can be obtained.

Furthermore, in the embodiment of an apparatus that is shown in FIG. 2, a toner image formed on the surface of photoreceptor 1 is directly transferred to medium P to which the toner image is to be transferred. However, the image-forming apparatus of embodiments may be further provided with an intermediate-transfer body. This makes it possible to transfer the toner image from the intermediate-transfer body to medium P to which the toner image is to be transferred, after the toner image on the surface of photoreceptor 1 has been transferred to the intermediate-transfer body. As such an intermediate-transfer body, there can be used one having a structure in which an elastic layer containing a rubber, an elastomer, a resin or the like and at least one covering layer are laminated on a conductive support.

In addition, the image-forming apparatus of embodiments may be further equipped with a static eliminator such as an erase light irradiation device. This may prevent incorporation of residual potential into subsequent cycles when the photoreceptor is used repeatedly. Accordingly, image quality can be more improved.

EXAMPLES

The embodiments as discussed above are illustrated in greater detail with reference to the following Examples and Comparative Examples, but the invention should not be construed as being limited thereto. In the following examples and comparative examples, all the "parts" are given by weight unless otherwise indicated.

Examples 1-3

Preparation of TEMPO-Terminated Poly(Butylacrylate) Material

For Examples 1-3, TEMPO-terminated poly(butylacrylate) materials were prepared as follows:

Butylacrylate (available from Aldrich Chemical Company), hydroxyl-TEMPO (available from Aldrich Chemical Company) and an azo initiator having chemical formula (12) (available as VAZO 67 from E. I. du Pont de Nemours and Company) were added, in the amounts indicated in Table 2, to a 1 liter round-bottomed flask with a gas bubbler and water condenser.

TABLE 2

(12)

| | Example 1 | Example 2 | Example 3 |
|---|---|---|---|
| Butylacrylate (mL) | 500 | 500 | 500 |
| Hydroxy-TEMPO (g) | 5.512 | 1.84 | 0.918 |
| Compound (12) (g) | 3.512 | 1.171 | 0.585 |

The mixtures were deoxygenated by bubbling argon through the neat liquid for 10 minutes and then heated to 145° C., using an oil bath. When the reaction temperature reached 135° C., a solid mixture of glucose and sodium bicarbonate (1 g, 1 g respectively) was added. The reaction mixtures were then stirred for the times indicated in Table 3, and cooled to yield polybutylacrylates having Mn and PD indicated in Table 3. Excess monomer was evaporated off to yield pure polybutylacrylates.

TABLE 3

| | Example 1 | Example 2 | Example 3 |
|---|---|---|---|
| Stirring Time (hours) | 4.5 | 6 | 5 |
| Mn (amu) | 4,519 | 12,341 | 19.509 |
| PD | 1.33 | 1.58 | 1.57 |

The solutions were obtained by dissolving the TEMPO-terminated poly(butylacrylate) materials of Examples 1-3 in butanol in the compositional amounts set forth in Table 4.

TABLE 4

| | Example 4 | Example 5 | Example 6 |
|---|---|---|---|
| Polymer (Example 1) (grams) | 37.232 | | |
| Polymer (Example 2) (grams) | | 40.697 | |
| Polymer (Example 3) (grams) | | | 47.345 |
| BuOH (grams) | 37.284 | 40.898 | 47.496 |
| Concentration (%) | 49.965 | 49.878 | 49.920 |

Example 4

Preparation of Siloxane-Containing Acrylate Material

For Example 4, a siloxane-containing acrylate material was prepared as follows:

Sodium acrylate (available from Aldrich Chemical Company), 32.5 grams, was dissolved in 250 mL DMF. To this solution, 143.4 grams of 3-iodopropylmethyldiisopropoxysilane was added. The reaction mixture was heated to 70° C. with stirring for 3 days, after which the reaction mixture was partitioned between 250 mL of hexanes and 750 mL water. The hexane layer was separated and twice washed with 250 mL saturated sodium chloride solution, dried over anhydrous magnesium sulfate and concentrated by rotary evaporation. The resulting compound was purified by vacuum distillation. The compound was present in its purest form in a fraction boiling at 75–79° C. at a pressure of 2.4–3.2×10$^{-2}$ torr. This reaction is represented schematically below. A yield of 46.7 grams compound (11) having a purity above 98% was obtained.

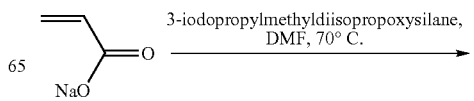

-continued

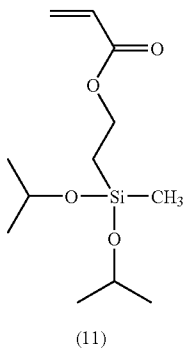

(11)

Example 5

Siloxane-Containing Coating Formulation

For Example 5, a siloxane-layer coating formulation was prepared as follows:

Into a 5 L flask, fitted with mechanical stirring, argon inlet, sodium hydroxide scrubber and 18-inch dry ice/isopropanol condenser, an arylamine compound of formula (7), the material of Example 4, methanol, compound (13) below and an ion exchange resin (AMBERLYST 15, available from Rohm & Haas Co. Corp.) were combined in the amounts indicated in Table 5. The reaction mixture was stirred for three hours.

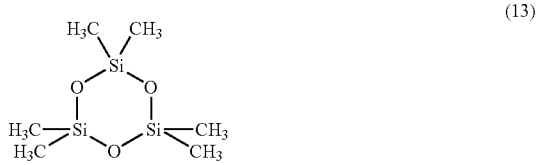

(13)

After three hours, n-butanol and water were added in the amounts indicated in Table 5. The reaction mixture was allowed to polymerize for 30 minutes.

Following polymerization, the reaction mixture was stabilized by the addition of aluminum trisacetylacethonate (Al(AcAc)$_3$), acetyl acetone (AcAc), and BHT, in the amounts indicated in Table 5.

Comparative Example 1

For Comparative Example 1, a siloxane-containing layer coating formulation was prepared as in Example 5 except that the material of Example 4 was replaced with a polyvinyl butyral of formula (14). The compositional amounts for Example 5 and Comparative Example 1 are set forth in Table 5.

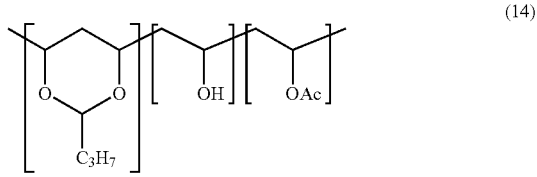

(14)

TABLE 5

| Material | Comparative Example 1 (g) | Example 5 (g) |
|---|---|---|
| Arylamine compound of formula (7) | 11 | 11 |
| Compound of formula III-3 | 6 | 5.412 |
| Example 4 | | 1.094 |
| Compound of formula (13) | 1 | 1 |
| MeOH | 11 | 11 |
| AMBERLYST 15 | 1.1 | 1.1 |
| n-BuOH | 32 | 32 |
| H$_2$O (2 equivalents) | 4.92 | 4.92 |
| Al(AcAc)$_3$ | 0.18 | 0.18 |
| AcAc | 0.18 | 0.18 |
| polyvinyl butyral of formula (14) | 2 | |
| BHT | 0.18 | 0.18 |

The resulting formulations of Example 5 and Comparative Example 1 are summarized in Table 6.

TABLE 6

| | Comparative Example 1 | Example 5 |
|---|---|---|
| Total (grams) | 68.46 | 66.968 |
| Solid Content (grams) | 20.54 | 19.048 |
| Concentration (%) | 30.00 | 28.44 |

Examples 6-8

Siloxane-Containing Layers Including Interpenetrating Networks

For Examples 6-8, a siloxane-containing coating formulations were prepared as follows:

Into a 250 mL flask, 13.394 grams of the material of Example 5 was combined with amounts of the materials of Examples 1-3, in the amounts indicated in Table 7.

Comparative Example 2

For Comparative Example 2, a siloxane-containing layer coating formulation was prepared as in Examples 6-8, except that the material of Examples 1-3 was replaced by polyvinyl butyral of formula (14), using the compositional amounts set forth in Table 7.

The resulting formulations of Examples 6-8 and Comparative Example 2 are summarized in Table 7.

TABLE 7

| | Example 6 | Example 7 | Example 8 | Comparative Example 2 |
|---|---|---|---|---|
| Example 5 (grams) | 13.394 | 13.394 | 13.394 | 13.394 |
| Example 1 (grams) | 0.8006 | | | |
| Example 2 (grams) | | 0.8020 | | |
| Example 3 (grams) | | | 0.8013 | |
| polyvinyl butyral of formula (14) (grams) | | | | 0.4 |
| Total (grams) | 14.194 | 14.196 | 14.195 | 13.794 |
| Solid Content (grams) | 4.210 | 4.210 | 4.210 | 4.210 |
| Concentration (%) | 22.87 | 22.87 | 22.87 | 23.38 |

Examples 9-14 and Comparative Examples 3-4

Photoreceptors Having Siloxane-Containing Layers

The coating solutions of Examples 6-8 and of Comparative Example 2 were coated onto two photoreceptors for evaluation. As shown in Tables 8 and 9, the thickness and quality of the coatings were good.

TABLE 8

| 30 mm drum | Example 9 | Example 10 | Example 11 | Comparative Example 3 |
|---|---|---|---|---|
| Full thickness (μm) | 26.0 ± 0.2 | 26.2 ± 0.3 | 26.1 ± 0.4 | 28.1 ± 0.3 |
| Charge transport layer thickness (μm) | 20.0 ± 0.4 | 20.0 ± 0.4 | 20.0 ± 0.4 | 20.0 ± 0.4 |
| Overcoat layer thickness (μm) | 1.5 ± 0.2 | 1.7 ± 0.3 | 1.6 ± 0.4 | 3.6 ± 0.3 |
| Coating Quality | Good | Good | Good | Good |

TABLE 9

| 30 mm drum | Example 12 | Example 13 | Example 14 | Comparative Example 4 |
|---|---|---|---|---|
| Full thickness (μm) | 24.2 ± 0.3 | 24.2 ± 0.3 | 24.2 ± 0.3 | 26.2 ± 0.2 |
| Charge transport layer thickness (μm) | 18.1 ± 0.2 | 18.1 ± 0.2 | 18.1 ± 0.2 | 18.1 ± 0.2 |
| Overcoat layer thickness (μm) | 1.6 ± 0.3 | 1.6 ± 0.3 | 1.6 ± 0.2 | 3.6 ± 0.2 |
| Coating Quality | Good | Good | Good | Good |

Figure 5:
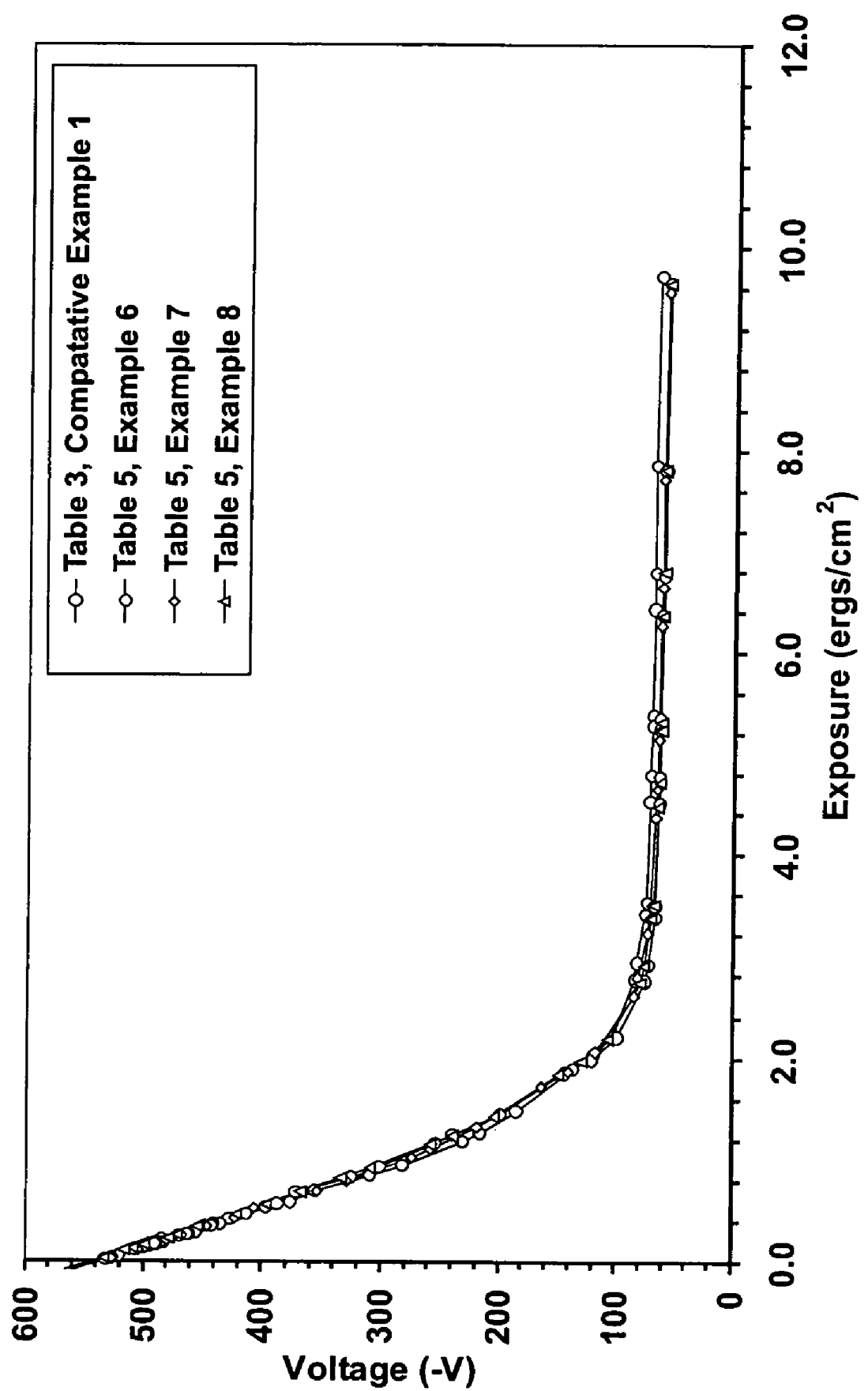
FIG. 5 is a graphical representation of the initial electrical performance, as measured as a voltage as a response of exposure to light, of photoreceptors of an exemplary embodiment.
Figure 6:
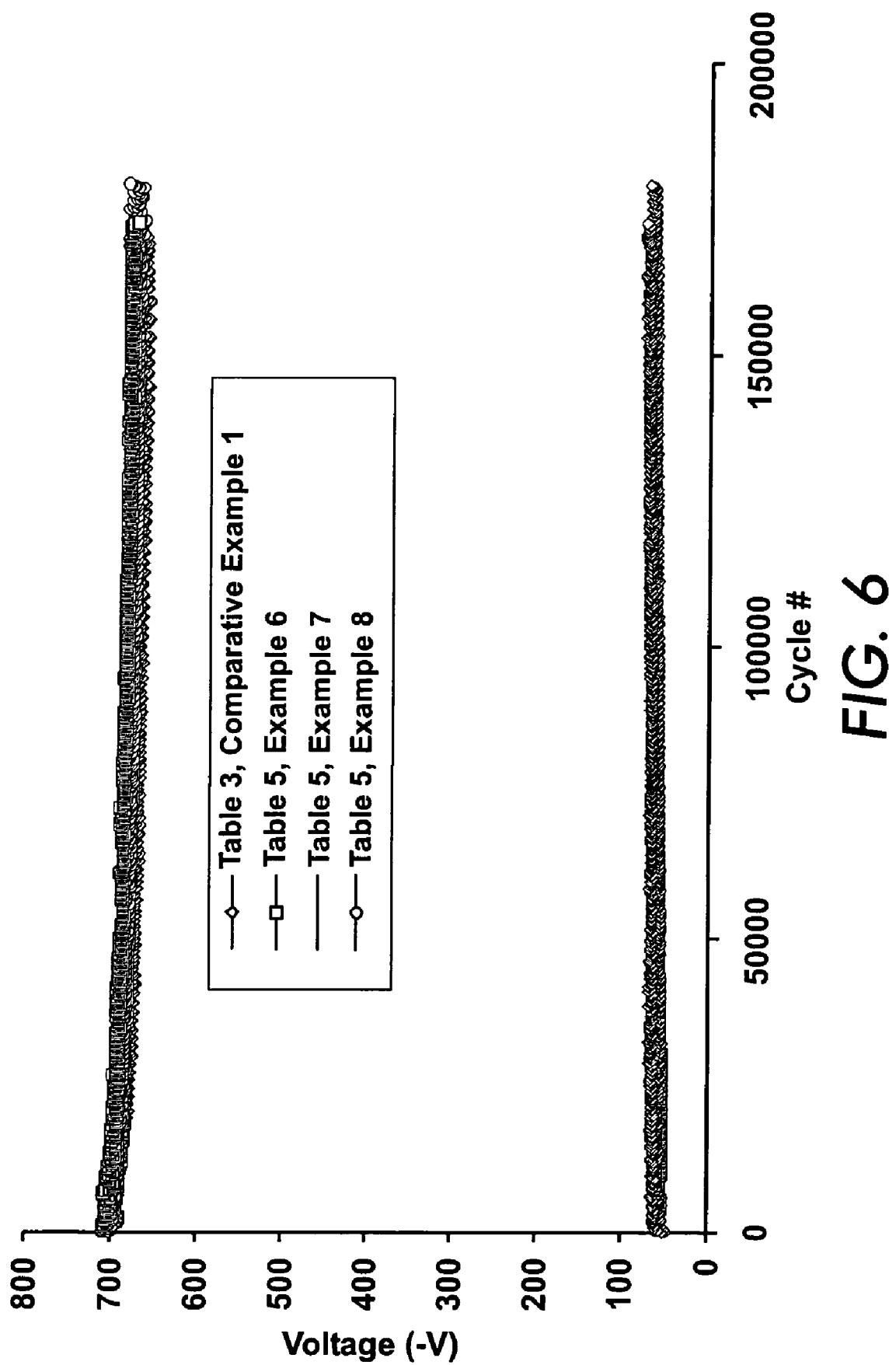
FIG. 6 is a graphical representation of the electrical performance over time, as measured as a voltage as a response to the number of cycles, of photoreceptors of an exemplary embodiment.
Figure 7:
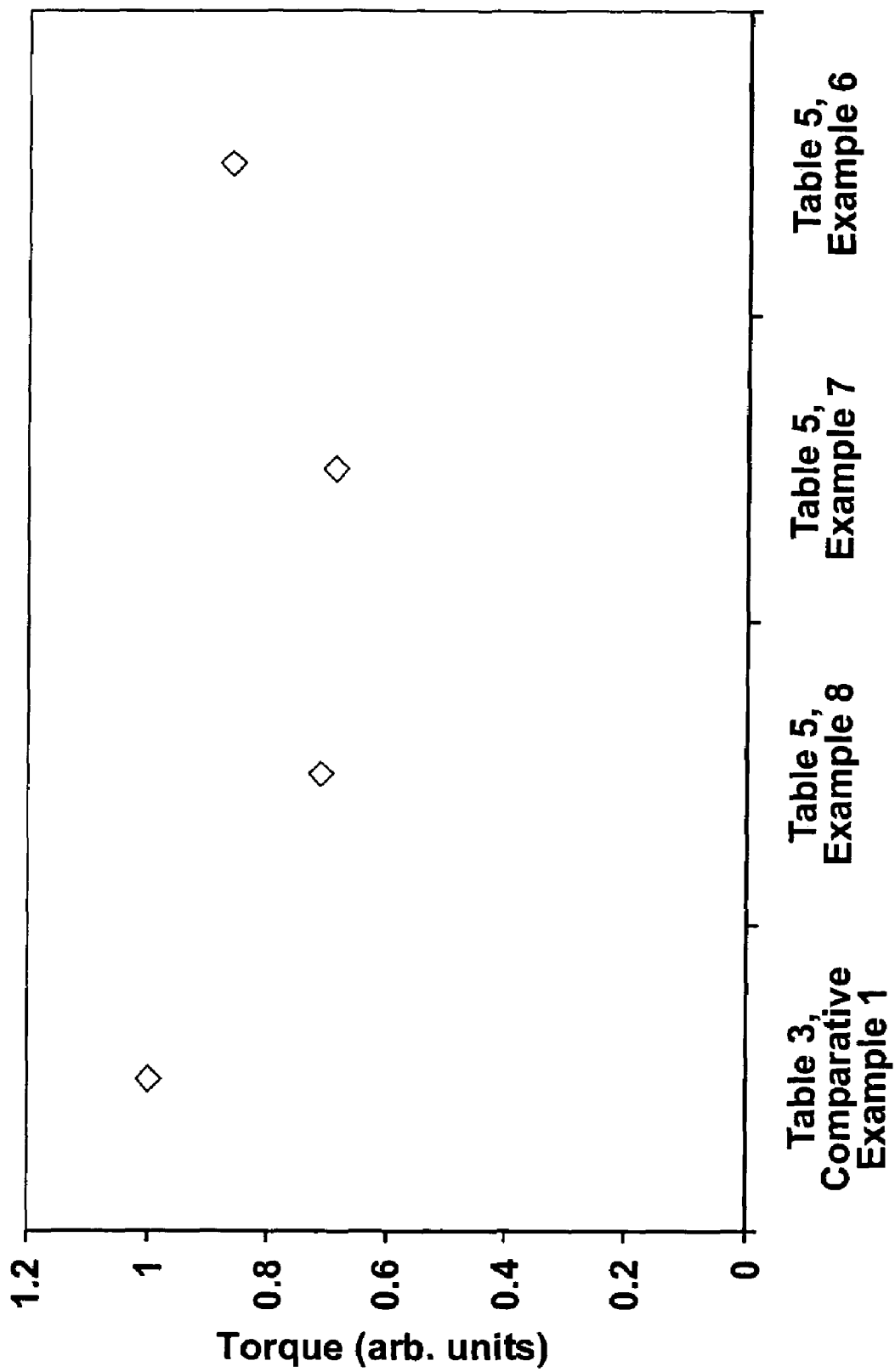
FIG. 7 is a graphical representation of the torque of a photoreceptor of an exemplary embodiment.

The photoreceptors of Examples 9-14 did not demonstrate any electrical issues when subjected to long-term cycling under hypermode testing (HMT, a method for extend longer term simple xerographic cycling, done in the absence of paper) conditions, as shown in FIGS. 5 and 6. As shown in FIG. 7, the photoreceptors of Examples 9-14 showed lower starting torque, compared to conventional photoreceptors that include a siloxane-containing compound, and showed a comparable running torque (without toner), compared to conventional photoreceptors that include a siloxane-containing compound.

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An interpenetrating network comprising an organic siloxane-containing material, a triphenylamine charge-transfer material and a polymeric binder material,
wherein the polymeric binder material is at least one member of the group consisting of polyacrylate materials having terminal TEMPO groups, and
wherein the organic siloxane-containing material is at least one member of the group consisting of organic siloxane-containing materials having at least one reactive double bond.

2. The interpenetrating network according to claim 1, wherein the organic siloxane-containing material is at least one member of the group consisting of organic siloxane-containing acrylates.

3. The interpenetrating network according to claim 1, wherein the organic siloxane-containing material is prepared by sol-gel polymerization.

4. A method of preparing an interpenetrating network, comprising:
sol-gel polymerizing a functionalized organosiloxane material to form an organic siloxane-containing matrix; and
reacting the organic siloxane-containing matrix with a triphenylamine charge-transfer material and a polymeric binder material having a terminal reactive group,
wherein the polymeric binder material is at least one member of the group consisting of polyacrylate materials having terminal TEMPO groups, and
wherein the organic siloxane-containing matrix is at least one member of the group consisting of organic siloxane-containing materials having at least one reactive double bond.

5. The method according to claim 4, wherein the organic siloxane-containing matrix is at least one member of the group consisting of organic siloxane-containing acrylates.

6. A silicon-containing layer comprising an interpenetrating network that comprises an organic siloxane-containing material, a triphenylamine charge-transfer material and a polymeric binder material,
wherein the polymeric binder material is at least one member of the group consisting of polyacrylate materials having terminal TEMPO groups, and
wherein the organic siloxane-containing material is at least one member of the group consisting of organic siloxane-containing materials having at least one reactive double bond.

7. The silicon-containing layer according to claim 6, wherein the organic siloxane-containing material is prepared by sol-gel polymerization.

8. An electrophotographic photoreceptor comprising a silicon-containing layer, wherein the silicon-containing layer comprises an organic siloxane-containing material, a triphenylamine charge-transfer material and a polymeric binder material,
wherein the polymeric binder material is at least one member of the group consisting of polyacrylate materials having terminal TEMPO groups, and
wherein the organic siloxane-containing material is at least one member of the group consisting of organic siloxane-containing materials having at least one reactive double bond.

9. The electrophotographic photoreceptor according to claim 8, wherein the silicon-containing layer is an outermost layer.

10. The silicon-containing layer according to claim 6, wherein the organic siloxane-containing material having at least one reactive double bond is at least one member of the group consisting of organic siloxane-containing acrylates.

11. The electrophotographic photoreceptor according to claim 8, wherein the organic siloxane-containing material having at least one reactive double bond is at least one member of the group consisting of organic siloxane-containing acrylates.

* * * * *